United States Patent
Cideciyan et al.

(10) Patent No.: US 8,996,958 B2
(45) Date of Patent: Mar. 31, 2015

(54) METHOD, DEVICE AND COMPUTER PROGRAM PRODUCT FOR DECODING A CODEWORD

(75) Inventors: Roy D. Cideciyan, Rueschlikon (CH); Ilias Iliadis, Rueschlikon (CH); Roman Pletka, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/574,368

(22) PCT Filed: Jan. 27, 2011

(86) PCT No.: PCT/IB2011/050355
§ 371 (c)(1),
(2), (4) Date: Jul. 20, 2012

(87) PCT Pub. No.: WO2011/092641
PCT Pub. Date: Aug. 4, 2011

(65) Prior Publication Data
US 2012/0290899 A1    Nov. 15, 2012

(30) Foreign Application Priority Data
Jan. 28, 2010    (EP) .................................... 10151942

(51) Int. Cl.
*G11C 29/00*    (2006.01)
*G06F 11/10*    (2006.01)

(52) U.S. Cl.
CPC .................................. *G06F 11/1072* (2013.01)
USPC .................................... 714/773; 714/E11.035

(58) Field of Classification Search
CPC ..... H04L 1/0065; H04L 1/005; H04L 1/0057; H04L 1/0059; H03M 13/2966
USPC .................. 714/773, 755, 758, 784, E11.035
See application file for complete search history.

(56) References Cited

U.S. PATENT DOCUMENTS

| | | |
|---|---|---|
| 5,475,693 A | 12/1995 | Christopherson et al. |
| 5,864,569 A | 1/1999 | Roohparvar |
| 6,209,113 B1 | 3/2001 | Roohparvar et al. |
| 6,839,875 B2 | 1/2005 | Roohparvar et al. |
| 7,450,425 B2 | 11/2008 | Aritome |
| 8,120,960 B2 * | 2/2012 | Varkony .................. 365/185.16 |
| 2007/0266298 A1 | 11/2007 | Hsieh et al. |
| 2008/0168319 A1 | 7/2008 | Lee et al. |
| 2009/0055706 A1 | 2/2009 | Lin |
| 2009/0177943 A1 | 7/2009 | Vilvus et al. |

(Continued)

OTHER PUBLICATIONS

Mielke et al; "Bit Error Rate in NANA Flash Memories"; IEEE CFP08RPS-CDR 46th Annual International Reliability; Physics Symposium, Phoenix, 2008; pp. 11.

*Primary Examiner* — Guy Lamarre
(74) *Attorney, Agent, or Firm* — Cantor Colburn LLP

(57) ABSTRACT

A method and apparatus for decoding a codeword received from a flash memory. The flash memory comprises multi-level flash memory cells, wherein each multi-level flash memory cell stores one symbol of the codeword. An ECC decoder is arranged for decoding the codeword into a decoded codeword and correcting a maximum number of errors. The method determines the number of errors in the codeword. If the number of errors is more than the maximum number of errors that the ECC decoder can correct, the method generates modified codewords, calculates a corrective effect of a modified codeword, and determines a decoded codeword based on the corrective effect.

18 Claims, 5 Drawing Sheets

(56) References Cited

U.S. PATENT DOCUMENTS

2009/0222708 A1    9/2009  Yamaga
2009/0292972 A1*  11/2009  Seol et al. .................. 714/763
2010/0293433 A1*  11/2010  Limberg .................... 714/755

* cited by examiner

METHOD, DEVICE AND COMPUTER PROGRAM PRODUCT FOR DECODING A CODEWORD

CROSS-REFERENCE TO RELATED APPLICATIONS

This application is based upon and claims priority from International Application PCT/IB2011/050355, filed Jan. 27, 2011, which in turn claims priority from European Patent Application No. 10151942.9, filed on Jan. 28, 2010. The entire contents of these applications are incorporated herein by reference.

TECHNICAL FIELD

The present invention relates to a method and a device for decoding a codeword. More particularly it relates to a method of data error correction of a codeword that has been generated using an error correcting code.

BACKGROUND OF THE INVENTION

Independent of the flash memory manufacturer, flash memories are exposed to a non-negligible raw bit error rate. Past research activities have studied and identified the reasons of these raw bit errors including program disturbance from tunneling and hot-electron injection, quantum-level noise effects, erratic tunneling, data retention due to stress-induced leakage currents (SILC) and read disturbance as well as detrapping-induced retention. Error-correcting codes (ECC) are put in place in order to achieve a better reliability. Reed Solomon (RS) or Bose-Chaudhuri-Hocquenghem (BCH) codes can be used for this purpose. Some hardware manufacturers explicitly recommend the usage of 4-bit ECC.

ECCs are characterized by the number of errors they can correct (t_c) as well as the number of errors they are capable to detect (t_d) where t_c<=t_d. If there happen to be more errors in a data block than can be detected, then there is a higher risk of miscorrection. The probability that more errors occur than can be detected can be reduced by choosing the parameters of the ECC accordingly.

An ECC decoder receives an encoded codeword and calculates therefrom a value that tells whether the encoded codeword comprises one or more errors. After this calculation, the ECC decoder may try to decode the codeword. The result of the decoding of an erratic codeword can be:
  the correct codeword being decoded,
  a decoding failure event called an erasure, e.g., the codeword could not be corrected, or
  a miscorrection resulting in an incorrect codeword.

An ECC for a certain application is designed to reduce the probability of miscorrections to an acceptable level. Therein it is better to detect an erasure than to make a miscorrection. In case of erasures, higher-level ECCs, like C2 codes such as RAID, can be used to detect and recover these cases.

The publication "Bit Error Rate in NAND Flash Memories", by N. Mielke, T. Marquart, N. Wu, J. Kessenich, H. Belgal, E. Schares, F. Trivedi, E Goodness, and L. R. Nevill, in IEEE 46th Annual International Reliability Physics Symposium, Phoenix, 2008 comprises an investigation of error patterns in multi-level-cell (MLC) based flash memories. The results from the analysis of four types of MLC-based NAND Flash memory devices show three type of errors, namely write errors causing cells being programmed with higher threshold voltage than intended, retention errors due to loss of electrons on the floating gate, and read distrurb errors due to a certain voltage applied to all deselected wordlines in the block. These error types cause bit errors in the sense that the threshold voltage is being moved up or down by one level.

In the article "Apparatus for improving Data Access Reliability of Flash Memory", by Jen-Wei Hsieh, Tei-Wei Kuo, Hsiang-Chi Hsieh, US Patent Application US2007/0266298A1, November 2007, a method is proposed that uses the exact value of the threshold voltage to indicate whether the measured voltage is in a reasonable range. If not, the cell read will be marked as suspicious. This information can then be used in ECC decoding to indicate where the error lies and hence improve data access reliability. This method is meant to be integrated on a flash chip directly, since access to the exact threshold voltage value is needed. If the measured threshold voltage exactly matches an incorrect level, then this method can't detect the error location.

U.S. Pat. No. 5,475,693 is directed to an error management process for flash EEPROM memory arrays. It describes a method of utilizing error-detecting and -correcting circuitry to detect and correct errors which can occur in data stored in multi-bit per cell format in a flash EEPROM memory array before those errors can affect the accuracy of data provided by that flash EEPROM memory array. This method comprises detecting errors present in a sector of an array being read, terminating the detection process if no errors are detected, correcting the errors if less than a first number of errors are detected, retrying the detection of errors in the sector of an array if greater than the first number of errors is detected, correcting the errors after the retrying if less than a second number of errors greater than the first number of errors are detected, marking the block of the array as questionable if more than the second number of errors but less than a third number of errors—which is the greatest the error detection process is able to correct—is detected; and then correcting the errors which are detected. The method tries to recover from more than a given number of errors by retrying, including retrying at lower read speed. If the retry fails, and the block had been marked questionable previously, it will be permanently removed from service. The method only relies on the used ECC. In a particular embodiment, the ECC detects six errors and can correct up to five errors. Consequently, a block with more than five errors is immediately marked as bad.

U.S. Pat. No. 6,209,113 is directed to a method and apparatus for performing error correction on data read from a multistage memory. According to one embodiment, a cell in a memory device is read to generate a read voltage determined by a state of the cell and one of an ordered succession of encoded signals is selected based on the read voltage, where each encoded signal corresponds to a field of bits and adjacent encoded signals correspond to respective fields of bits that are different only in a single bit. The selected encoded signal is decoded to generate a field of uncorrected bits and a field of syndrome bits indicating any error in the uncorrected bits. The syndrome bits are decoded to generate correction bits to correct the error, and the uncorrected bits are combined with the correction bits to generate a field of corrected bits. The method includes the steps of encoding data read from each memory element of the array, detecting an error in the encoded data from one memory element, and correcting the error by changing a selected number of bits of the encoded data. This method uses Gray coding so that there can be only one erroneous bit in a cell. Therefore, the decoder being used only has to correct a small number, preferably one, of bits per cell, instead of potentially all bits in the cell, which reduces the amount of ECC data to be stored. The method does error correction decoding first and then accepts the correction only if the error changes the one bit per symbol. This method does not allow to correct more errors than the ECC decoder is capable of correcting.

US2008/0168319 is directed to a flash memory device error correction code controller. An ECC controller for a flash memory device stores M-bit data, where M is a positive integer equal to or greater than 2, and includes an ECC encoder and an ECC decoder. The ECC encoder generates first ECC data for input data to be stored in the flash memory device using a first error correction scheme and generates second ECC data for the input data using a second error correction scheme. The input data, the first ECC data, and the second ECC data are stored in the flash memory device. The ECC decoder calculates the number of errors in the data read from the flash memory device and corrects the errors in the read data using one of the first ECC data and the second ECC data selectively based on the number of the errors. The method uses two error correction schemes. Preferably, one of the schemes is faster, but corrects less errors than the other. Depending on the number of errors detected, one of the schemes is used to correct the error. The scheme requires to store the redundant bits for both correction schemes, and hence significantly increases the amount of redundant information without being able to correct more errors.

U.S. Pat. No. 7,450,425 is directed to a method for non-volatile memory cell read failure reduction. One embodiment includes performing a first read operation, using an initial read potential, to determine a state of a selected memory cell in a string of non-volatile memory cells. This method includes determining whether the state of the selected memory cell is an incorrect state by performing a first check using a data checking technique, and if the incorrect state is determined, performing a number of subsequent read operations using read potentials stepped to a higher and a lower read potential to a particular count of read operations. In various embodiments an ECC check pass can also occur when the data being read contains a number of erroneous bits which are correctable by the ECC decoder. The threshold number of bits correctable by a ECC decoder can depend on the particular ECC technique being employed. Some ECC techniques can correct single-bit errors, while others can correct double-bit errors or other higher numbers of bit errors. In instances in which the read data includes fewer than the threshold number of cells correctable by the ECC decoder, the ECC decoder can correct the erroneous bits prior to providing the read data to a controller. When reading from a flash cell, an appropriate voltage is applied to the control gate and the drain. The comparison of the drain-to-source current, which indicates the threshold voltage of the cell against a reference current, allows to determine the state of the memory cell. The method varies the reference current in case the data could not be recovered using the ECC decoder and performs subsequent read operations on the same cell. The process is repeated until the ECC decoder can in fact recover the data, or a given amount of steps have been tried without success. In the latter case a read error is returned. This method utilizes the analog the threshold voltage signal in the flash memory chip. However, a solid-state memory controller manufacturer may not have access to the threshold voltage signal. Also, the method introduces delay and complexity by applying a number of additional read operations with varied voltage steps in to any direction to a single read potential. This method also introduces the likelihood of read-induced errors.

U.S. Pat. No. 6,839,875 is directed to a method and apparatus for performing error correction on data read from a multistage memory. The method for performing error correction on data read from a multistate memory array works by encoding data read from each memory element of the array, detecting an error in the encoded data from one memory element, and correcting the error by changing X bits of the encoded data (preferably X=1), and a multistate memory system for performing the method. Preferably the system is a circuit in which each memory element is a flash memory cell. A data bit is read from each memory cell by asserting a signal having a signal value in a value range, where the value range is a member of a sequence of non-overlapping value sub-ranges. The method also comprises encoding the voltage signal into one of a sequence of encoded signals, each of the encoded signals representing a unique ordered set of binary bits; and performing error detection and correction on the encoded signal to detect errors in the encoded signal and to correct correctable errors in the encoded signal.

US2009/0055706 is directed to a method and apparatus for flash memory error correction. In the flash memory device, a memory array comprises a main area for data storage, and a spare area for storage of parities associated with the stored data. An erasure table maintains an erasure list indicating addresses of defects in the memory array where data storage is unavailable. A processor performs error correction on the stored data based on the parities and the erasure list to output a corrected output. A flash memory device, comprises a memory array, comprising a main area for data storage, and a spare area for storage of parities associated with the stored data; an erasure table, maintaining an erasure list of defects in the memory array where data storage content maybe not correct; a processor, performing error correction on the stored data based on the parities and the erasure list to output a corrected output. An error correction method for a flash memory device, is described wherein the flash memory device comprises a memory array, comprising a main area for data storage, and a spare area for storage of parities associated with the stored data; the error correction method comprises establishing an erasure list for maintaining defects in the memory array where data storage content maybe not correct; performing error correction on the stored data based on the parities and the erasure list to output a corrected output. According to error correction theory, the ability to recover data is increased when specific addresses in the memory array are known defects. The idea is to introduce an erasure table which stores addresses of defects in order to tolerate more errors. The erasure table can be established at the manufacturing stage. New defective addresses are automatically added when detected during the error correction process. If all error locations are known, the method corrects errors up to the amount of errors detectable by the ECC decoder being used. Here, additional storage space is needed to hold the erasure table.

U.S. Pat. No. 5,864,569 is directed to a method and apparatus for performing error correction on data read from a multistate memory. This method uses the bit flipping idea in MLC Flash but requires the information being stored in a cell to be Gray encoded. Further, it is assumed that the erroneous symbol is being known.

It is therefore a challenge to provide a method for data error correction that overcomes the drawbacks of the known data error correction methods.

SUMMARY OF THE INVENTION

According to one aspect of the invention, a method for decoding a codeword received from a flash memory is proposed. The flash memory comprises several multi-level flash memory cells, wherein each such multi-level flash memory cell stores one symbol of the codeword. An ECC decoder is arranged for decoding the codeword into a decoded codeword and is designed to correct a maximum number of errors. The method comprises an error check step for determining the number of errors in the codeword. If the number of errors is more than the maximum number of errors the ECC decoder can correct then at least one of a first symbol modification step and a second symbol modification step is performed. In the first symbol modification step a first modified codeword is generated by increasing the value of the symbol to the next higher value level, and in the second symbol modification step a second modified codeword is generated by decreasing the value of a symbol (Si) to the next lower value level. In an analysis step the corrective effect of the symbol modification steps is calculated and in a return step the decoded codeword is determined based on the corrective effect.

The proposed decoding method can recover from one additional error than the ECC decoder being used is capable of recovering. Hence, the proposed method can be used in conjunction with an ECC decoder with a native error correction capability t in order to correct a number of t+1 errors. The proposed decoding method utilizes knowledge of probable error patterns in multi-level-cell (MLC) flash memories. The modification of the symbols to either of the adjacent values of those symbols, has two advantageous effects. On the one hand it reduces the number of modified code words that need to be checked if they lead to the correct decoded modified codeword, and on the other hand it reduces the number of decoded modified codewords which are legal but not correct. The first effect mainly reduces calculation effort, while the second effect further reduces the probability of decoding failure.

In one embodiment for a received codeword each symbol is shifted the equivalent of one threshold voltage (V_T) level higher to form a first modified codeword if such a codeword exists and the equivalent of one threshold voltage (V_T) level lower to form a second modified codeword if such a codeword exists. The thereby obtained modified codewords are decoded with the ECC decoder resulting in decoded modified codewords, also referred to as candidate decoded codewords. The number of occurrences of each candidate decoded codeword is counted. For a received codeword with t+1 errors exactly t+1 occurrences of the correct candidate decoded codeword will result. If there is exactly one candidate decoded codeword with t+1 occurrences, then this is the correct one. If there is more than one candidate decoded codeword with t+1 occurrences, then the decoding method is not capable of correcting the error and will return an erasure of the codeword. The underlying reasoning is that by the decoding method a received codeword W that has t+1 errors is modified to get one error more, an equal number of errors, or one error less. By reducing the number of errors by 1 the modified codewords will only have t errors and can be corrected and decoded to the correct encoded data word. Since the received codeword has t+1 errors this effect will occur exactly t+1 times. In the event that there is more than one modified codeword that shows this effect, there is a situation that the decoder can not decide which of the modified codewords is the correct one, and can not perform an informed correction and decoding. This can happen if the received codeword lands in an area where its distance to the correct encoded data word is exactly the same as the distance to another legal encoded data word.

The proposed decoding method provides the following advantages: First, it can recover from one additional error over the number of errors that the ECC decoder being used is originally capable of recovering. Hence, the proposed decoding method can be used in conjunction with an ECC decoder with an error correction capability t in order to correct t+1 errors. This comes at the cost of some additional computational effort which scales linearly with the number of symbols in a codeword. This additional computational effort occurs only in the rare case when exactly t+1 errors are recovered. If there are less than t+1 errors, then the decoding method introduces no additional computational overhead at all. This allows to use the proposed decoding method on-line in a flash memory controller. This decoding method could also be executed off-line in a data recovery mode.

For generating the codeword, an ECC encoder may be used that provides correction information, i.e. parity information, together with the data word allowing to detect t+1 errors, while allowing to correct t errors in the codeword. A known practice is to arrange an ECC decoder that theoretically is capable to correct t errors but in reality only uses the capability to correct t−1, t−2 or less errors. This has the advantage to increase the robustness of the ECC decoder by decreasing the miscorrection probability while at the same time using a simpler and hence faster logic for the ECC decoder. For example, a Reed-Solomon (RS) code can be used that enables correction of t errors and detection of t+1 errors. The ECC decoder can also be built to correct only t−1 errors, while it will still be able to detect t+1 errors.

Hence, this decoding method can be used in conjunction with an ECC decoder that only corrects t−1 errors while still being able to correct t errors. Thereby, the proposed decoding method allows to use a simpler ECC decoder that will decode the data faster in the case when up to t−1 errors occur and will still be capable of correcting t errors in the data block. The penalty of the decoding method is that if the decoding method is used to correct exactly t errors, then a higher computational effort occurs to recover the data. Nevertheless, this event is considered to happen relatively rarely, and if it happens the additional delay is deemed acceptable.

In a preferred embodiment of the method, the first symbol modification step is omitted if the value of the symbol is at the highest level to which the multi-level flash memory cell can be programmed. Increasing the symbol value beyond the highest level to which the underlying multi-level flash memory can be programmed would mean to assume an impossible value of that cell. Since this value is impossible, the calculation associated with this level is unnecessary. Therefore omitting this step for that case will lead to a reduction of the complexity of the method.

In a further preferred embodiment of the decoding method the second symbol modification step is omitted if the value of the symbol is at the lowest level the multi-level flash memory cell can be programmed to. Decreasing the symbol value below the lowest level to which the underlying multi-level flash memory can be programmed would mean to assume an impossible value of that cell. Since this value is impossible, the calculation associated with this level is unnecessary. Therefore omitting this step for that case will lead to a reduction of the complexity of the method.

In a further preferred embodiment of the decoding method the at least one symbol modification step is repeated with another symbol. By executing one or more symbol modification steps for one symbol the decoding method tests whether this modification leads to a corrective effect. Thereby the probability to correct an error that has not been correctable by the ECC decoder, is increased. However, if the symbol on which the at least one symbol modification step has been executed is not the location of such error, it is advantageous to perform the same kind of test on one or more other symbols.

In a further preferred embodiment of the decoding method after at least one of the symbol modification steps has been conducted for one symbol, the analysis step is conducted for the symbol. In this embodiment instead of executing first all symbol modification steps and thereafter conducting the analysis step, the analysis step is executed after the symbol modification steps for one symbol. Hence each symbol gets its own set of symbol modification steps and analysis step. This way the corrective effect can be determined right after the symbol modification steps for that symbol. The decoding method does not have to be executed for several symbols before it can determine the corrective effect, and determine for which symbol the corrective effect was achieved. Hence, conducting the analysis step for each symbol, will lead to a quicker assessment of where the error that is looked for lies. This decoding method works particularly well in an embodiment where the corrective effect of a single symbol is associated with a sufficient probability that the associated codeword is in fact the correct basis for the decoded codeword. Running an ECC decoder with less than full error correction capability, i.e. able to correct less than t errors, would be such an example. Here the probability of miscorrection is reduced to a level, that an analysis step signaling a reduction of the number of errors with the modified symbol, respectively the modified codeword, can be used to terminate the decoding method for the codeword, assuming with sufficient probability that the decoding method has found the correct modified codeword. With other settings, this embodiment will lead to a shorter process at the expense of risking a miscorrection. The additional logic for performing this decoding method is significantly smaller than the one for the ECC decoder and the ECC decoder needs not to be changed.

In a further preferred embodiment of the decoding method the at least one symbol modification step is repeated for other of the symbols until the corrective effect found in the analysis step indicates that the corresponding modified codeword is decodable into the decoded codeword. In accordance with the explanation of the above paragraph, it can prove advantageous to stop the decoding method when the analysis step signals a correct modified codeword, since this way the decoding method execution time can be reduced.

In a further preferred embodiment of the decoding method after the at least one symbol modification step has been conducted for all the symbols, the analysis step is conducted. This embodiment provides useful for a decoding system where the probability of miscorrection is considered too high to stop the decoding method anytime inbetween. Here, all symbols are tested, and only then the analysis step is conducted, having access to the modified codewords of all symbols. Thereby the correction probability is increased. This decoding method is particularly useful if an ECC decoder is used running at full capability, i.e. being able to detect t+1 errors and able to correct t errors.

In a further preferred embodiment of the decoding method the at least one symbol modification steps is repeated moving from one symbol to the next right symbol in the codeword. This way the decoding method is working itself through a codeword in logical order which facilitates keeping track of which symbol it has already been applied to.

In a further preferred embodiment of the decoding method the order of the symbols on which the at least one symbol modification step is performed, is selected based on an estimation of the error probability of the symbols. This step introduces more complexity over the left-to-right way described above. However, using an error probability estimation can be used to target those symbols first which are the most likely to be erroneous. In combination with a set up that terminates the process once the corrective effect has been confirmed for the corresponding symbol and symbol modification step, this set up can lead to a shortening of the method.

In a further preferred embodiment of the decoding method in an error type determination step the most likely error type for the multi-level flash memory cells is determined, and depending thereon a selection is made which of the symbol modification steps shall be performed. Also here, the decoding method can be reduced in simplicity by predicting where the error most likely lies. If it can for instance be predicted or estimated that the error source is a write error, then the most likely error is a value shift of the symbol to a higher value. Hence performing only the second symbol modification step leads to half the number of symbol modification steps being performed to arrive with sufficient probability at the correct codeword. This improvement can also be applied across all symbols, such that for all symbols only the second symbol modification step is executed, while the first symbol modification step is omitted. The analysis step is of course still executed either for each symbol separately, or for several or even all symbols in group.

In a further preferred embodiment of the decoding method in an error type determination step the most likely error type for the multi-level flash memory cells is determined, and wherein depending thereon a selection is made which of the symbol modification steps shall be performed first. This improvement works similar to the one discussed above. However here, still both symbol modification steps are performed and only their order is predetermined in dependence of the error type determination step. Since both symbol modification steps are executed, the probability of finding the correct codeword is increased, while at the same time maintaining the positive effect of increasing the probability of finding the correct codeword early, and being able to stop the decoding method earlier with a gain in decoding method execution speed.

In a further preferred embodiment of the decoding method the analysis step comprises in a decoding step calculating the number of errors in the modified codeword and in an effect step determining whether the calculated number of errors in the modified codeword is lower than the number of errors in the codeword. The reduction of the calculated number of errors by the symbol modification step is an indicator that the decoding method has found the correct codeword.

With an ECC decoder designed to run with less than full error correction capability, i.e. able to correct less than t errors, the probability of miscorrection is reduced to a level, that an analysis step signaling a reduction of the number of errors with the modified symbol, respectively the modified codeword, can be used to terminate the decoding method for the codeword, assuming with sufficient probability that the decoding method has found the correct modified codeword. With an ECC decoder being able to correct t errors, the effect of error reduction is a less reliable factor, however, being checked for all symbols in the codeword the effect can be used to pick the one modified codeword that has this effect or to pick one of the modified codewords that have this effect. The latter decoding method can be an educated guess, a random pick or a pick using in conjunction other pieces of information to increase the likelihood of a correct codeword.

In a further preferred embodiment of the decoding method the analysis step comprises in a decoding step decoding the modified codewords, and for all decoded modified codewords counting the number of occurrences of the decoded modified codewords, and in an effect step determining if there is exactly one decoded modified codeword whose number of occurrences is equal to one more than the maximum number of errors correctable by the decoder. With this improvement the probability of a correct codeword is further increased. The decoding step and the effect step can be executed together or also separately. For instance the decoding step can be executed right after the symbol modification step or symbol modification steps, whereas the effect step is in a preferred embodiment only executed after all decoding steps have been executed, i.e. after for all decoded modified codewords the number of occurrences of the decoded modified codewords has been counted.

In yet another further preferred embodiment of the decoding method the decoded modified codewords are converted into hash values that are entered into a candidate hash map, together with the number of occurrences of the decoded modified codewords. This improvement allows a quicker and less space-consuming handling, since instead of the full decoded modified codewords only a smaller hash value needs to be stored. When the final choice of the entry in the candidate hash map is made, based on the number of occurrences, the corresponding decoded modified codeword can be reconstructed. This reconstruction can for example make use of an additional piece of information stored in the hash map, such as information about which symbol was modified in which direction to arrive at the corresponding modified codeword. Since t+1 of such operations of the received codeword lead to such a modified codeword, any one of those operations could be used.

In a further preferred embodiment of the decoding method the return step comprises determining the correct decoded codeword from the decoded modified codeword that is used in the effect step, when the effect step yields a positive result. A positive result is a result that indicates that a decoded modified codeword is the correct decoded codeword into which the codeword is to be decoded. Depending on the type of effect step this can be indicated by different factors such as the calculated number of errors in the modified codeword being lower than the number of errors in the received codeword, or if there is exactly one decoded modified codeword whose number of occurrences is equal to one more than the maximum number of errors correctable by the decoder.

In a further preferred embodiment of the decoding method the return step comprises determining an erasure of the codeword in an erasure step when the effect step yields a negative result. A negative result can be either the absence of a positive result, or several positive results competing with each other. For instance if there is more than exactly one decoded modified codeword whose number of occurrences is equal to one more than the maximum number of errors correctable by the decoder, also referred to as potential candidates, then there is no unique positive result, and it can be advantageous to decide for an erasure instead of a miscorrection with a likelihood of 1−1/(potential candidates) when randomly choosing one of them.

According to the second aspect of the invention, a decoding apparatus is provided. The decoding apparatus is designed for decoding a codeword received from a flash memory comprising several multi-level flash memory cells, wherein each such multi-level flash memory cell stores one symbol of the codeword. The decoding apparatus further comprises an ECC decoder being designed for decoding the codeword into a decoded codeword, and being designed to correct a maximum number of errors, comprising an input port for receiving the codeword, and a calculator designed for determining the number of errors in the codeword. If the number of errors is more than the maximum number of errors the decoder can correct, the calculator is also designed for generating a first modified codeword by increasing the value of the symbol to the next higher value level, and generating a second modified codeword by decreasing the value of the symbol to the next lower value level. The calculator can then calculate the corrective effect of the symbol modification steps and determine the decoded codeword based on the corrective effect. The decoding apparatus further comprises an output port for outputting the decoded codeword.

According to a third aspect of the invention, a computer program product comprising a computer-readable medium embodying program instructions executable by a processor to perform a decoding method as described above is presented.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

DETAILED DESCRIPTION OF THE PREFERRED EMBODIMENTS

Figure 1:
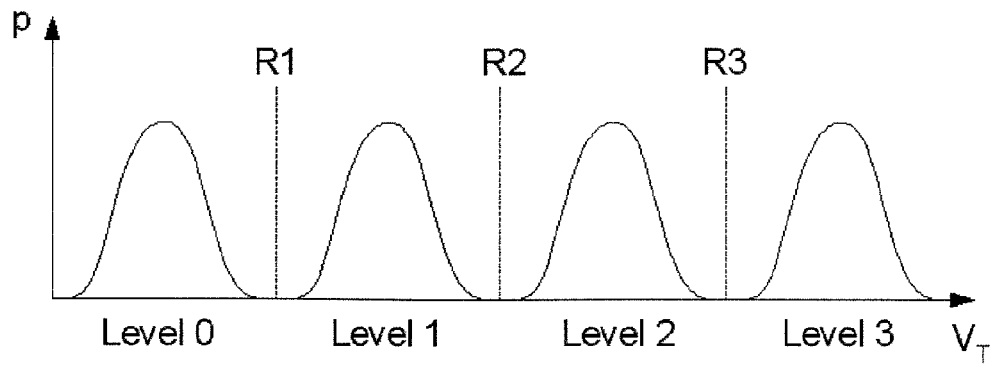
FIG. 1, a graph depicting the probability density of an MLC cell being programmed to a certain level x as a function of the threshold voltage (V_T), FIG. 2, a graph depicting the impact of the dominant types of write errors on the probability density, and the effect of write errors shifting the threshold voltage (V_T) to higher levels than intended, FIG. 3, a graph depicting the effect of retention errors tending to shift the threshold voltage (V_T) to the next lower level in case of an error, FIG. 4, a graph depicting the effect of read disturbance errors tending to move the threshold voltage (V_T) from level 0 to level 1, FIG. 5 a block diagram of a computer system with a flash memory, FIG. 6 a block diagram of a flash memory array with an encoder/decoder circuit, FIG. 7, a flow chart of processing a received codeword with t+1 errors, FIG. 8, a flow chart of correcting an error using an adjacent error correction scheme, FIG. 9, a visualization of an encoding process, FIG. 10, a visualization of a decoding process.

FIG. 1 depicts a graph showing the probability density of a multi-level-cell (MLC) being programmed to a certain level x, as a function of the threshold voltage (V_T). Single-level-cell (SLC) based flash memory stores one bit per cell. In multi-level-cell (MLC) based flash memories data is stored in that the threshold voltage (V_T) of one cell can be programmed to more than two different levels x. In FIG. 1 there are four levels, hence this cell can store two bits of information.

Figure 2:
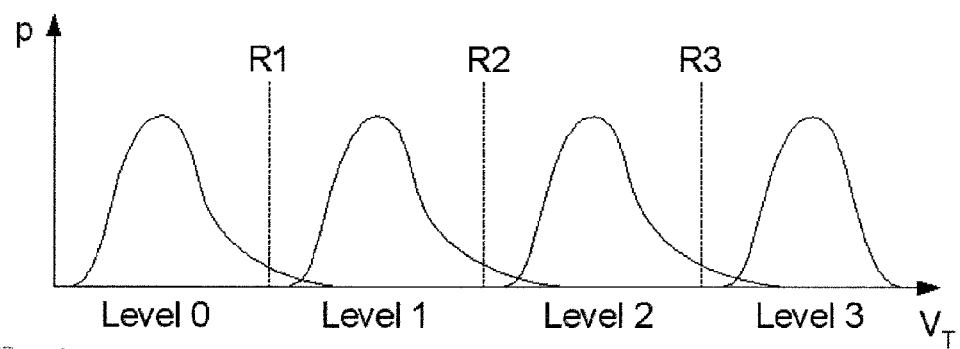

FIG. 2 depicts the impact of the dominant types of write errors on the probability density. A write error shifts the threshold voltage (V_T) to the next higher level.

Figure 3:
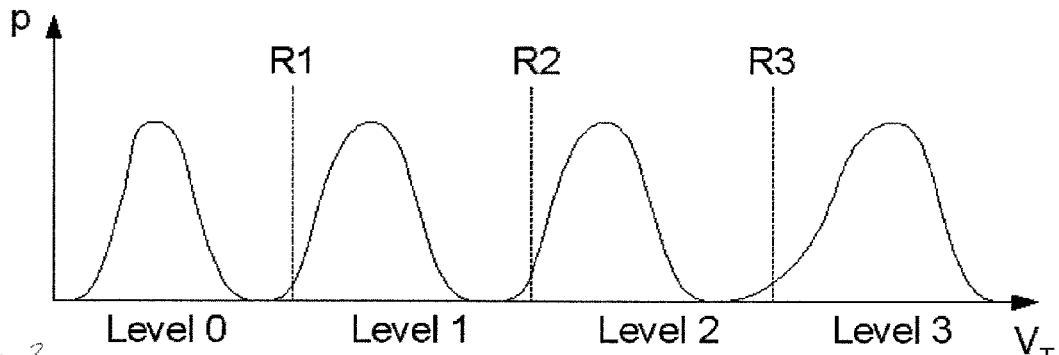

FIG. 3 depicts the effect of a retention error on the probability density. A retention error shifts the threshold voltage (V_T) to the next lower level.

Figure 4:
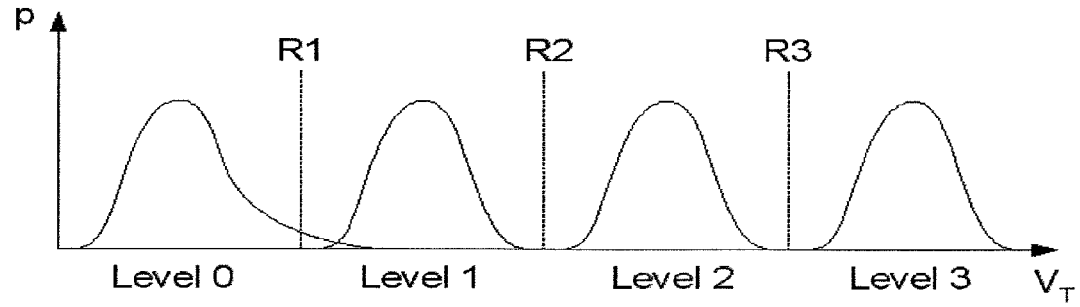

FIG. 4 depicts the effect of a read disturbance error on the probability density. A read disturbance error shifts the threshold voltage (V_T) from level 0 to level 1. Other levels are not affected.

Error sources are grouped into 3 categories:
- Write errors are dominated by over-programming failures causing cells to be programmed with a higher threshold voltage (V_T), as is illustrated in FIG. 2.
- Retention errors depend on the number of program/erase cycles as well as the retention time and are mostly due to charge loss. They result in moving the threshold voltage (V_T) to the next lower level, as shown in FIG. 3.
- Read disturbance errors cause level 0 cells to move to the next higher threshold voltage (V_T) level, as visible in FIG. 4.

All these 3 different error sources have in common that they shift the value of the threshold voltage (V_T) to an adjacent level, i.e., to the next higher or to the next lower level of the threshold voltage (V_T). Shifts to other levels are possible in theory, but in practice very unlikely. This knowledge is used in the decoding method proposed herein to correct one additional error over the number of errors that an ECC decoder can normally correct.

Figure 5:
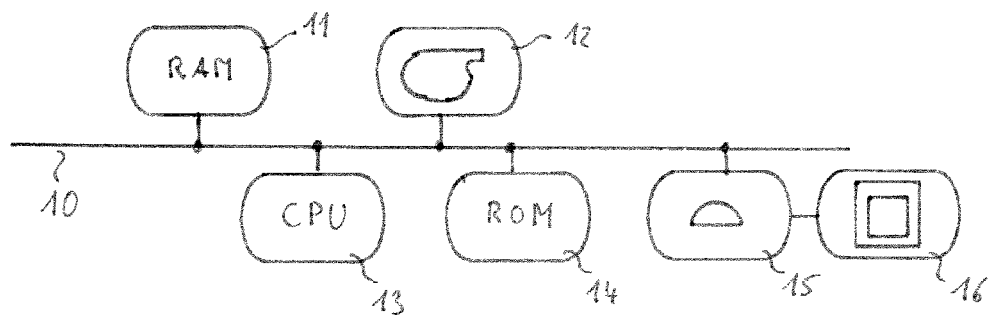

Referring now to FIG. 5, there is illustrated a block diagram of an exemplary digital system utilizing flash memory arrays, such as a computer system. Such a system includes a central processing unit 13 which executes the various instructions provided to control the operations of the system. The central processing unit 13 is joined to a bus 10 adapted to carry information between the various components of the system. Joined to the bus 10 is a main memory 11 which is typically constructed of dynamic random access memory to store information during a period in which power is provided to the system. Also connected to the bus 10 are various peripheral components such as a read-only memory 14, a long-term non-volatile memory 12 and circuitry such as a frame buffer 15 to which data may be written which is to be transferred to an output device such as a monitor 16 for display. Instead of the electro-mechanical hard disk drive which is typically used for long-term memory, a flash memory array may be used as the long-term memory 12. Such a flash memory array may comprise a single bit or a multi-level memory system and may include circuitry for controlling the operation of the memory array including all of the operations associated with reading, programming (writing), and erasing the memory array.

Figure 6:
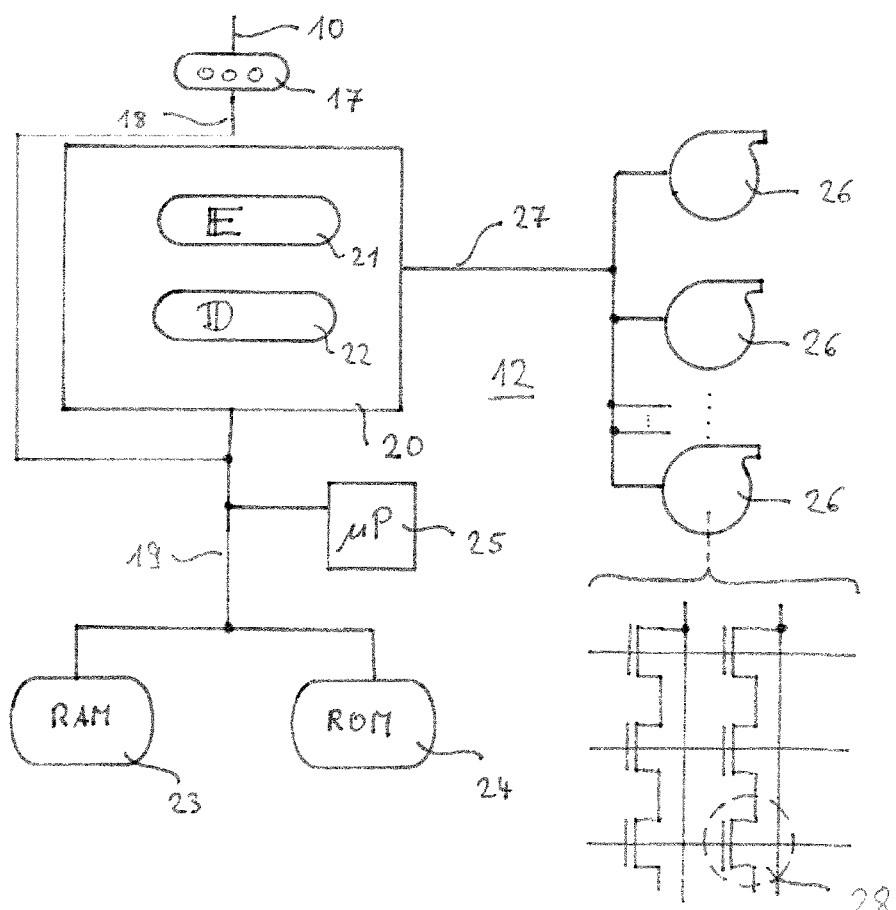

FIG. 6 illustrates in block diagram form a memory system 12 such as that illustrated in FIG. 5. The memory system 12 is joined to the bus 10 through an interface 17. The interface 17 provides appropriate circuitry for providing signals furnished on the bus 10 to a flash system bus 18. The flash system bus 18 transfers signals from the interface 17. In one embodiment, this logic circuit 20 is an application specific integrated circuit (ASIC) which provides logic for implementing and coordinating the various operations of the long-term memory, also referred to as memory system 12, such as reading, writing, erasing, and determining the status of the various portions of the flash memory array. The logic circuit 20 functions as a command center and controls operations occurring in a plurality of flash chips 26 via a flash bus 27 so that those flash chips 26 function together as a long-term flash memory system. The flash chips 26 comprise a multitude of multi-level flash memory cells 28. Encoder circuit 21, also referred to as ECC encoder, and decoder- and correction circuit 22 are included within the logic circuit 20. These circuits 21 and 22 are utilized to accomplish error detection and correction. The logic circuit 20 is assisted in its operations by a microprocessor 25 which is associated on a microprocessor bus 19 with random access memory 23, and read-only memory 24. The microprocessor 25, random access memory 23, and read-only memory 24 function essentially as a general purpose processor. Data arriving on the flash system bus 18 can be buffered in the RAM 23, and from there be transferred to the flash chips 26 via the logic circuit 20, which provides the encoding of the data. The read-only memory 24 is utilized in one embodiment to store a process utilized in controlling a portion of the error detection and correction operation used in carrying out the proposed decoding method.

In one embodiment, each pair of flash memory chips 26 includes thirty-two blocks of memory transistors. Each chip 26 of the pair includes one-half of the memory transistors of the thirty-two blocks and control circuitry for effecting, among other things, read, write, and erase operations in the individual memory cells of the blocks on that chip pair. Each flash chip pair is joined to the flash bus 27 by a command user interface that provides command signals to the chip pair from the logic circuit 20 of the system.

An error correction code (ECC) C has an error correction capability t, and an error detection capability s, where (t<=s), and a minimum distance d=s+t+1. Furthermore, an ECC encoder 21 uses the error correction code C to generate codewords in order to store them in an MLC flash memory device 12 like the one described in FIGS. 5 and 6. A bounded-distance ECC decoder corrects up to a perceived number e of errors in such codewords read from the MLC flash memory device 12 where e<(t+1). Hence the ECC decoder is designed to correct a maximum number t of errors.

The following nomenclature is used: An original data word O is encoded by an encoder to form an encoded data word W*. This is a one-to-one mapping operation. This encoded data word W* comprises the original data word O together with redundancy information, and represents an allowed encoded data word W*, because the redundancy information has been derived from the original data word O without error. The encoded data word W* is hence a correct, error-free representation of the original data word O. The encoded data word W* is also referred to as a legal data word, because it comprises no error. The redundancy information is mathematically linked to the original data word O. For a legal data word, the redundancy information in the encoded data word W* is exactly the redundancy information that results from the underlying encoding algorithm.

The encoded data word W* is stored in memory, and for whatever reason, an error occurs, such that when trying to read the encoded data word W*, instead an erroneous version thereof is read, which is the received codeword W, having a number of e* errors. The challenge is now to find a way to calculate from the received codeword W the encoded data word W*, and hence the original data word O. The decoder is able to detect a perceived number e of errors of the received codeword W, where e<=e*. The step of calculating from the received codeword W the encoded data word W* is referred to as decoding. Once having obtained the correct encoded data word W*, the original data word O can be generated therefrom by removing the redundancy information.

In a preferred embodiment, the proposed decoding method can correct t+1 errors in an MLC flash memory device 12 according to the following preferred algorithm:

1. Symbol modification step: One symbol within the received codeword W is changed to each of its nearest neighboring symbols to form one or two modified codewords W', W".
2. Decoding step: The resulting modified codeword W', W" is decoded using the ECC decoder.
3. Effect step: The ECC decoder either fails to decode, or finds for the decoded modified codeword D', D" a perceived number e', e" of errors that differs from the perceived number e of errors of the received codeword.
4'. If neither e=0 nor e<t+1, then the decoder finds itself in a situation where by conclusion e>t. Then, with an ECC decoder having a correction capability of t, all possible decoded modified codewords are formed as described above, using the symbol modification step and the decoding step, for all symbols, and their number of occurrence is counted. At the end, if there is a unique decoded modified codeword that is obtained t+1 times, this decoded modified codeword is declared as the decoded codeword, otherwise the received codeword is replaced by an erasure.

4". If e=t, with an ECC decoder having a correction capability of t−1, one keeps forming modified codewords and decoding them until the ECC decoder finds a codeword that differs in t−1 symbols from the modified received word. In this case, the decoded codeword corresponding to this modified received codeword is declared as the correct decoded codeword.

In the latter case all the occurrences of decoded codewords are counted.

In a specific first preferred embodiment a decoder is used in this example with an error correction capability of t. If the minimum distance of the code is d=2t+2 the proposed algorithm can correct any t+1 errors although the error correction code (ECC) C has an error correction capability t. If the minimum distance of the code is d=2t+1 the proposed algorithm can correct t+1 errors although the error correction code (ECC) C has an error correction capability t, wherein however extremely rare cases of miscorrection may occur.

An ECC encoder with a correction capability of t errors is used to encode a data word into a codeword that consists of n symbols S each of size m, where m corresponds to the number of levels in an MLC flash memory device. When an ECC decoder can't decode the codeword, most likely there are t+1 errors, and with a lower probability there might be more than t+1 errors. In such cases data recovery is processed as is described in FIG. 7.

Figure 7:
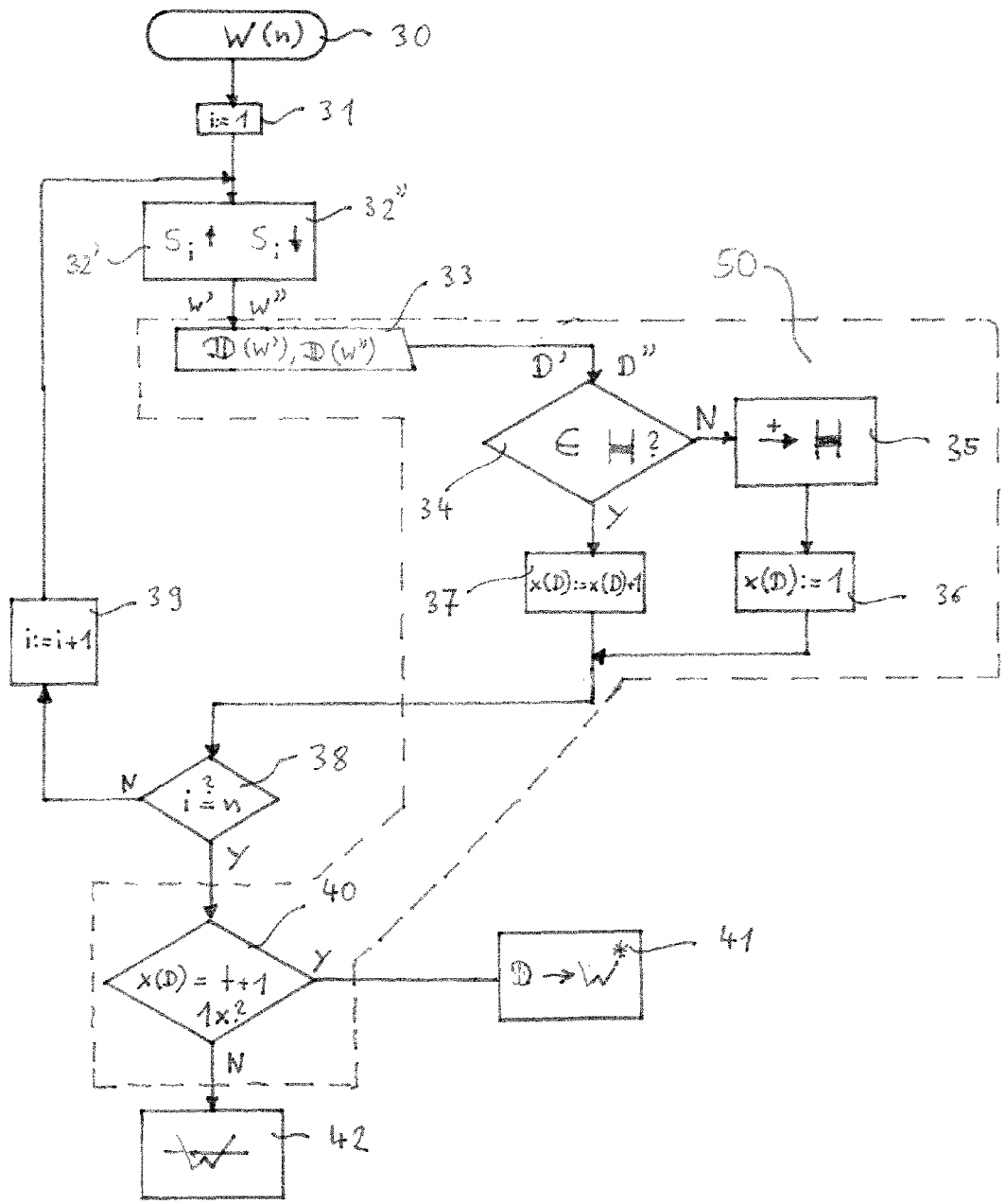

FIG. 7 shows the flow chart of processing a received encoded codeword W with e=t+1 errors.

The received codeword W is received from the flash memory 26, in a receiving step 30. An index i is set to a value 1 in a reset step 31. This index i is used as the pointer to the respective symbol Si. Each such symbol Si is the information stored in a respective multi-level flash memory cell 28. With the index i being set to 1, in two symbol modification steps 32', 32", the first symbol S1, i.e. i=1, in the received encoded codeword W is chosen and changed to each of its adjacent values, i.e., once, in the first symbol modification step 32', to the next higher threshold voltage (V_T) level and once, in the second symbol modification step 32", to the next lower threshold voltage (V_T) level. This results hence in a set of two modified codewords W', W" if the value of the first symbol S1 was one of the medium values, i.e. neither the lowest nor the highest possible value. It results in one modified codeword, W' or W", if the value of the first symbol S1 was one of the border values, i.e. either the lowest or the highest possible value level i.e. value. In that case the highest value will not be shifted higher, and only the lower adjacent value level will be selected to form a first modified codeword W'. Similarly, the lowest value will not be shifted lower, and only the higher adjacent value level will be selected to form a second modified codeword W".

Next an analysis step 50 follows. In this analysis step 50, the corrective effect of the symbol modification steps 32', 32" is calculated.

In this embodiment, the analysis step 50 comprises a decoding step 33 in which the modified codewords W', W" are decoded with the ECC decoder 22, resulting in a corresponding number of decoded modified codewords D', D". These decoded modified codewords D', D" represent the attempt of using the error correction information in the modified codewords W', W" to arrive at the legal encoded data word W*. As explained above, such encoded data word W* is legal if the redundancy information is mathematically correctly linked to the rest of the information in the encoded data word W*.

Each of the decoded modified codewords D', D" is then processed in a hash map process as follows:

In a hash map check step 34 a check is performed whether the decoded modified codeword D' or D" is already contained in a candidate hash map H, also just referred to as hash map H. If not, an entry for the decoded modified codeword D' or D" will be added in a map adding step 35 and the number of occurrences x(D) of the decoded modified codeword D' or D" will in an entry step 36 be set to the value 1. If an entry for the decoded modified codeword D' or D" is already contained in the candidate hash map H, a new entry for the decoded modified codeword D' or D" is not added to the candidate hash map H, but instead its number of occurrences x(D) is incremented by 1 in an incrementation step 37.

As the name implies, the hash map H is preferably a map that stores hash values. In a preferred embodiment hence, to create the entry, the decoded modified codewords D', D" are not entered as is into the has map H, but they are converted into hash values by a corresponding hash calculator. Thereby the hash map H, which is substantially a table, for storing the decoded modified codewords D', D" can be more efficiently searched in constant time and made smaller, because the hash values are smaller by nature than the underlying decoded modified codewords D', D". Still for each decoded modified codeword D', D" that has been replaced by its hash value in the hash map H, the corresponding number of occurrences x(D) is also stored in the hash map H. The hash map H can also be a table that holds no has entries, i.e. be any kind of table that is used to store the results of the analysis step 50, be it in original form or be it in a form that already does some calculation, like reducing the number of entries that are possible to be eligible for becoming the correct decoded modified codewords D' or D". It is advantageous to have only one entry in the hash map H per decoded modified codeword D' respectively, D".

An additional optional step can be performed before the hash map check step 34: An adjacency check step can be conducted that checks whether the modified codewords W', W" comprise an error pattern that is allowed, i.e. consistent with the idea of moving a symbol to an adjacent value. A symbol S of the decoded modified codewords D', D" is only allowed in this context, if it is no more than 1 level away from the level of the corresponding symbol S in the received codeword W. In other words, the adjacency check step checks for each symbol S of the decoded modified codeword D', or D" whether its value is not greater by more than 1 or smaller by more than 1 than the value of the corresponding symbol S of the received codeword W. If this criterion is not fulfilled, the decoded modified codewords D', D" are not considered correct, and hence need no further processing. They can be dismissed. This way, the correction capability of the proposed decoding method is further increased, since those decoding steps 33 that are resulting in legal but non-adjacent decoded modified codewords D', D", actually lead to decoded modified codewords D', D" that are incorrect. Taking those results out before conducting the hash map check step 34, reduces the likelihood of miscorrection, and also of erasure due to multiple hash map entries having a number of occurrences x(D) being t+1.

Processing the decoded modified codewords D', D" will result in zero or more entries for these decoded modified codewords D', D" being added to the candidate hash map H or their number of occurrence x(D) being updated in this candidate hash map H if they already exist there. Therefore all decoded modified codewords D', D" in the candidate hash map H are distinct. The candidate hash map H holds either the decoded modified codewords D', D" and the associated number of occurrences x(D) of the decoded modified codewords D', D", or for each decoded modified codeword D', or D" a hash value of the decoded modified codeword D', D" together with the position of the symbol in the received codeword W and its modification type (increasing or decreasing) pertaining to one symbol modification step that lead to the corresponding decoded modified codeword D', or D". Preferably this information is collected for the symbol modification step that has been carried out when the entry for the decoded modified codeword D', D" is made the first time into the hash map H. This way, the decoding method can later reconstruct from this information in the hash map H the correct decoded codeword D. The candidate hash map H can be any type of data structure that allows to search and process this data.

Thereafter, in an index incrementation step 39 the index i is incremented and the process comprising symbol modification step 32, decoding step 33 and the hash map process is repeated until all symbols Si of the received encoded codeword W have been processed, i.e. until i=n. This condition is tested by an exit check step 38.

Once all decoded modified codewords D', D", being obtained by executing the symbol modification step 32', respectively 32" on all symbols S, have been processed, the number of occurrences x(D) of each decoded modified codeword D', D" in the candidate hash map H is checked in an effect step 40. More precisely, it is determined if there is exactly one decoded modified codeword D', D", whose number x(D) of occurrences is equal to one more than the maximum number t of errors correctable by the decoder.

This concludes the analysis step 50, as then the corrective effect has been determined. If there is exactly one candidate word, i.e. decoded modified codeword D' or D", having a number of occurrences x(D' or D")=t+1, then this decoded modified codeword D' or D" is returned in a return step 41 as the codeword W*. This is referred to as a positive result of the effect step 40. If the corresponding decoded modified codeword D' or D" has been stored in the hash map H in form of the position and modification type of the modified symbol S, a decoding operation is performed by applying this information from the hash map H to the received encoded codeword W to return the corresponding decoded modified codeword D' or D", which is here declared as the codeword W*.

Otherwise, if there is not exactly one candidate word, i.e. decoded modified codeword D' or D", having a number of occurrences x(D' or D")=t+1, then this is referred to as a negative result of the effect step 40, and determined as such in the return step 41, and hence an erasure of the codeword W in question is returned in an erasure step 42.

The described embodiment works particularly well with an ECC decoder 22 that is designed to run at full error correction capability, i.e. that is able to correct a number of t errors because of the capability to eliminate cases of multiple decoded codewords having the same number t+1 of occurrences.

Figure 9:
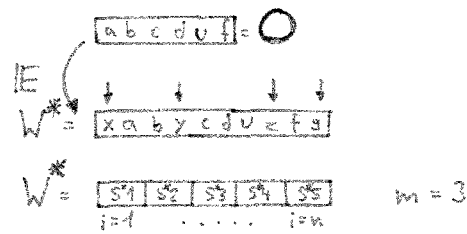

In FIG. 9 it is illustrated, how from an original data word O, via an encoding step E an encoded data word W* is generated. The encoded data word W* comprises additional redundancy information that is usable for error detection and error correction. The number and, if applicable, the position of the redundancy information in the encoded data word W* depends on the type of error correction code and encoder used. In the example depicted, the original data word O comprises the bits "abcdef", while the encoded data word W* comprises additional bits "x, y, z, g", in the form "xabycdezfg".

For the purpose of the decoding method described herein, the encoded data word W* is also representable as a suite of symbols S1, S2, ... wherein each symbol S can have a number of values, determined by the type of memory cell used. For instance in a 4-level MLC flash memory cell, a symbol S can have one of the values 0, 1, 2, 3, hence such cell stores two bits of information, and each symbol S represents such two bits of information. The encoded data word W* comprises generally a number of n symbols S, wherein each symbol S can take a value from 0 up to m−1, m−1 being the highest value the MLC flash memory cell can be programmed to. In the depicted example the encoded data word W* comprises five symbols S while m=4.

Figure 10:
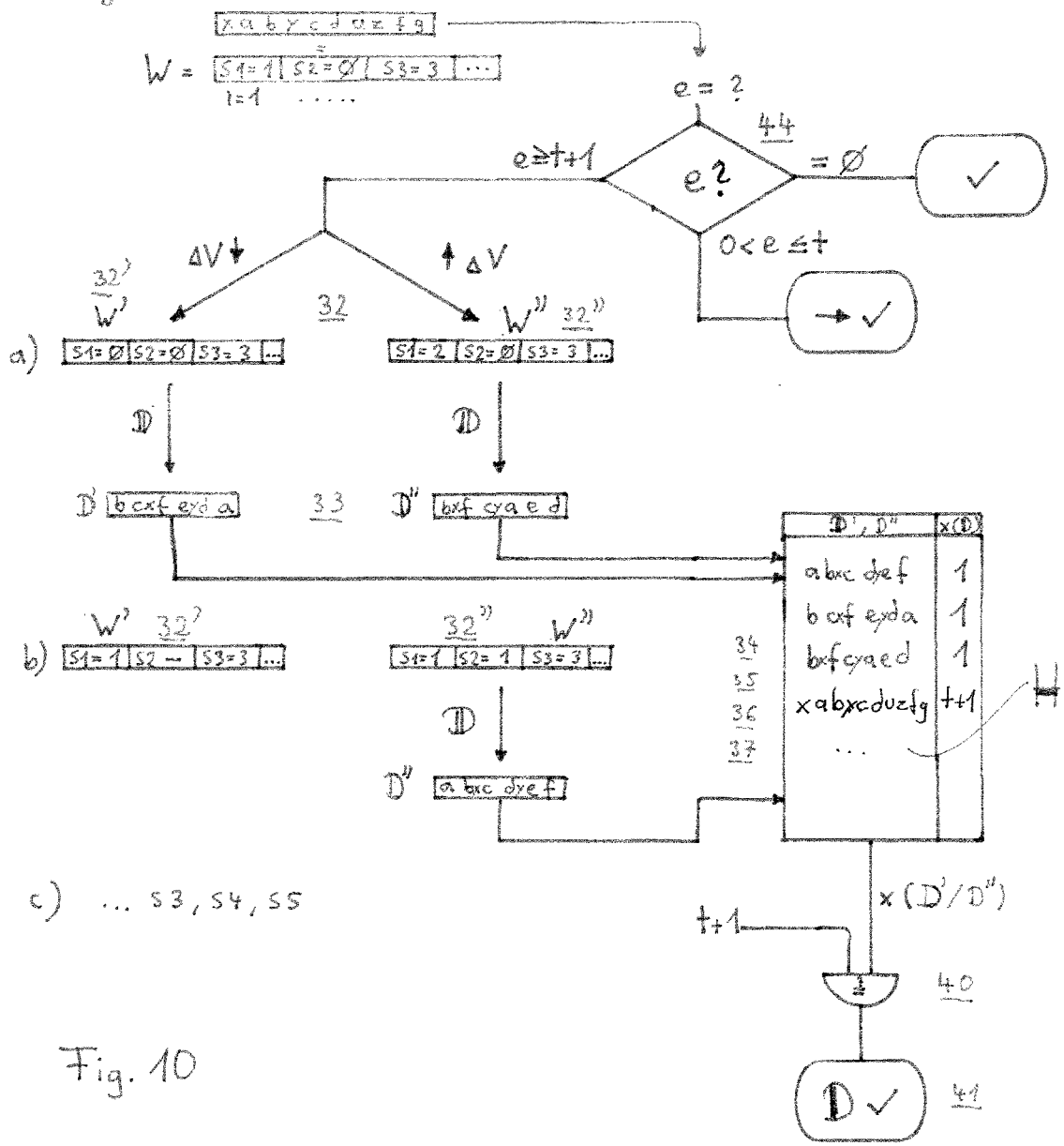

In FIG. 10, a decoding process is illustrated that can preferably be performed by a decoding apparatus. In an attempt to read the encoded data word W* from the flash memory, the received codeword W is read. The received codeword W can be received at the decoding apparatus at an input port. The decoding process seeks to establish if the received codeword W is erroneous, and if so, whether the received codeword W can be decoded correctly to obtain the encoded data word W*. First, the received codeword W is used to determine the perceived error condition. This step can be performed by a calculator, being part of the decoding apparatus. Based hereon, one of several cases can occur:

1. If no errors are indicated, i.e. the perceived number e of errors is 0, the decoder 22 outputs the decoded data word.
2. If more than zero, but less than or equal to t errors are indicated, i.e. 0≤e≤t+1, the decoder 22 will be used to correct the errors and output the decoded data word.
3. If none of case 1 and 2 occurs, there are more than t errors. Then the decoding method described herein can be used to attempt to recover from these errors.

In above cases 1 and 2, it is also possible that a miscorrection occurs, namely if the perceived number e of errors is smaller than t+1 while the real number of errors e* is actually larger than t+1.

In case 3 above, i.e. e>=t+1, the received codeword W is modified as already described above: The first symbol Si is once incremented by one voltage level and once decremented by one voltage level, as shown in FIG. 10 under a), thereby obtaining modified codewords W' and W". The modified codewords W' and W" are then decoded. For the obtained candidate codewords D' and D", i.e. decoded modified codewords D' and D", entries will be made into the candidate hash map H together with a counter for the number of occurrences x(D' or D") of the respective candidate codeword D' or D".

Next, the second symbol S2 is subjected to that process. However, here the decrementing will not happen, since the value of the second symbol S2 is already at 0, as shown in FIG. 10 under b). So here only one candidate codeword D" results. For the obtained candidate codeword D" an entry is made in the candidate hash map H together with a counter for the number of occurrences x(D") of the candidate codeword D".

As indicated in FIG. 10 under c) this process is executed for each following symbol Si, until the last symbol Sn, here S5, has been reached. Candidate codewords D' or D" that have no existing entry in the candidate hash map H will be entered into that candidate hash map H with a number of occurrence x(D)=1. For candidate codewords D' or D" that already have an entry in the candidate hash map H, because they have occurred before, the respective number of occurrences x(D) is incremented, each time they occur.

Thereafter the candidate hash map H is filled with entries for a number of candidate codewords D', D" and their respective number x(D'), x(D") of occurrences. Then, the value of t+1 is compared with each number x(D'), x(D") of occurrences. If there is exactly one candidate codeword D' or D" with its number of occurrences x(D'), or x(D") being exactly equal to t+1, then the decoder 22 has found in that candidate codeword D' or D" the correct data word for the encoded data word W*.

As explained above, the decoding accuracy can be further increased by only entering those candidate codewords D', D" into the candidate hash map H which fulfill an adjacency criterion. That criterion is that the value difference between each symbol S of the candidate codewords D', D" and the corresponding symbol S of the received codeword W is not larger than 1, i.e. |Si(W)−Si(W)|<=1 for all i, respectively |Si(W)−Si(D")|<=1 for all i.

The calculator can be designed to perform one or more of the symbol modification steps 32', 32", analysis step 50, and return step 41. If a decoded codeword D', or D" results from the return step 41, the decoded codeword D', or D" can be output via an output port.

In a specific second preferred embodiment a decoder is used in this example with an error correction capability of t−1. The minimum distance of the code is d=2t+1. In this case, the claimed algorithm can correct t errors. During normal operation up to (t−1) errors are corrected by the ECC decoder 22 while improving on decoding speed and decoding complexity when compared to an ECC decoder that corrects up to t errors. In the case of the occurrence of t errors, the algorithm can be used to correct t errors. In this case, the algorithm always succeeds to correctly decode a received codeword with t errors. More generally, during normal operation up to (t−x) errors can be corrected by the ECC decoder where 0≤x≤t, x being a fixed number determined by the decoder design. In case of t−x+1 errors, the proposed decoding method can be used to correct t−x+1 errors. In this case, the algorithm always succeeds to correctly decode a received codeword with t−x+1 errors.

Figure 8:
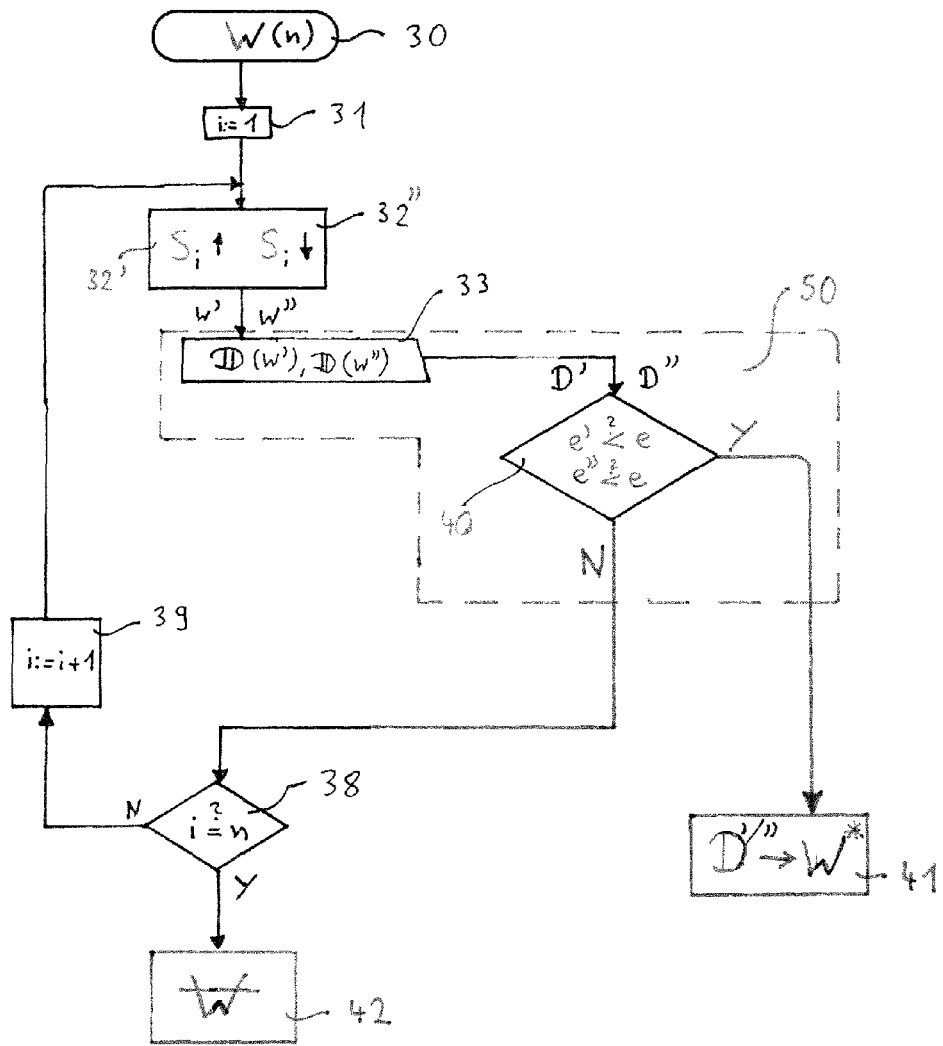

FIG. 8 illustrates an alternative embodiment of the correction of an error using the proposed error correction scheme. This embodiment provides advantages if the ECC decoder 22 is designed to detect a number t of errors and correct a number t−1 of errors, i.e. this corresponds to x=1.

A received codeword W comprises a number n of symbols S each of size m where m corresponds to the number of programmable levels in a multi-level flash memory cell 28 of an MLC flash memory device.

The codeword W is received from the flash memory 26 in a receiving step 30. An index i is set to a value 1 in a reset step 31. This index i is used as the pointer to the respective symbol Si. With the index i being set to 1, in a first symbol modification step 32' and in a second symbol modification step 32" the first symbol S1 is chosen and changed to each of its adjacent values, i.e., to the next higher respectively next lower threshold voltage (V_T) level. This results in a set of one or two modified codewords W' and W", as already described in conjunction with the first specific embodiment. This set will have exactly one modified codeword W' or W", if the original level of the first symbol S1 is either the highest or the lowest possible value level, or two modified codewords W' and W" if it is on a value level in-between.

For all of the resulting modified codewords W' and W" the number e', e" of errors detected in these modified codewords is calculated in a decoding step 33. This calculation can be performed by executing a regular decoding algorithm since in the resulting decoded modified codeword D', or D", the information about how many perceived errors e' or e" the corresponding decoded modified codeword D', or D" has, is included.

Next an effect step 40 follows, in which it is determined whether the calculated number e', e" of errors in the modified codeword W', W" is lower than the perceived number e of errors in the codeword W. If the number e', e" of errors detected has been reduced from t to t−1 for a decoded modified codeword W' or W" it becomes clear that the choice of the corresponding adjacent value has led to an improvement and the correct decoded codeword, which is then declared as the encoded data word W*, can be obtained by decoding this modified codeword D' or D" in a return step 41.

If however the number e', e" of errors detected went up—compared to the perceived number e of errors of the received codeword W—from t to t+1, or the number e', e" of errors stazed the same, the choice of the adjacent value level was not correct and the decoding method proceeds with the next symbol Si in the received codeword W. The value of the index i is incremented in the index incrementation step 39 to then repeat the symbol modification step 32, etc. but this time with the next symbol Si+1.

Once the correct decoded codeword D' or D" has been found, the algorithm finishes processing in the return step 41. The decoded codeword D' or D" is declared as the data word W*.

The algorithm will alternatively stop in an erasure step 42 after having tried to modify up to and including the last symbol Sn in the received codeword W without success.

There are a variety of possibilities of how to step through the symbols Si, when repeating the symbol modification steps 32', 32". A first possibility is to run from left to right, a second is to run from right to left. Both methods have the advantage that they are relatively easy to implement by using a binary pointer. The expense in keeping track of which symbol Si is currently under investigation, i.e. processed with the symbol modification steps 32', 32", is kept relatively low.

An alternative is to spend some more intelligence on which symbols Si to choose in which order. An estimation can be made about the error probability of the symbols Si. In that estimation it can be determined which of the symbols Si are the most likely ones to exhibit an error. Then, one of those symbols Si can be selected to be the first symbol Si to be handled with the symbol modification steps 32', 32". Next, the process can continue either with a shift to the next right symbol or the next symbol Si can be again one of those which have a higher error likelihood than other symbols Si. In particular where the decoding method described herein is set up to end when the analysis step 50 for the symbol Si that is currently processed, yields a positive result, this selection of symbols Si has a higher likelihood to terminate the decoding method earlier. Hence the decoding method takes less time.

Another way of simplifying and also accelerating the decoding method, is to determine upfront which error type is the most likely one occurring with the received codeword W. Since, as explained above, different error types have a different distribution of which voltage level changes occur more likely, having an idea which of those error types is or is likely present, can be used to make a choice as to which symbol modification steps 32', 32" to perform first or which symbol modification steps 32', 32" to perform at all. For instance, with a retention error, the typical change is a voltage level drop by one level. Hence, a shift of the value of the corresponding symbol Si to the next higher level would eliminate this kind of error, and lead to a correct decoded codeword D'.

The decoding method can hence be accelerated by only performing the first symbol modification step 32' on the symbols Si. If the assumption of the error type was correct, the decoding method should be able to correctly decode the codeword W. If the return step 41 however returns no correct decoded codeword D', the return step 41 instead determines an erasure and the decoding method ends with an erasure.

To enhance the decoding probability, the above improved decoding method can again be enhanced by adding the execution of the second symbol modification steps 32" for the symbols Si. A preferred order would hence be to first execute all first symbol modification steps 32', perform the analysis step 50 on the resulting first modified codewords D', check if that one yields a positive result, and if that is not the case, executing the second symbol modification steps 32", and then another time the analysis step 50, this time calculating the corrective effect of the second symbol modification steps 32". Then the decoding method has run through all possible symbol modification steps 32' and 32", and either returns a decoded codeword D' or D", or an erasure.

The described embodiment works particularly well with an ECC decoder 22 that is designed to run at less than full error correction capability, i.e. that is able to correct a number e of errors less than t errors, because of the reduced probability of miscorrection with this setup.

This algorithm scales linearly with the number of symbols S in the codeword W. In general less than n modified received codewords W', W" need be checked as it is sufficient to find the first occurrence of an error in the received codeword W. Hence the average number of symbols S that need to be checked is about n/(t+1) under the assumption that errors are equally distributed.

Further, if the values of the symbols within the codewords W are equally distributed, then in an MLC flash memory with 4 levels there is a chance of 0.5 to be at the highest or lowest level. This effect also reduces the number of modified codewords W', or W" to be checked.

The algorithm can be further improved if the most likely error type can be estimated, such as when a write error causes the threshold voltage (V_T) to move one level higher. If a received codeword W is being checked just after it has been written and an error is detected, then it will be most likely due to a write error and not a retention error. In this case, the decoding method can be improved by being performed on only one adjacent level relative to the value of each symbol S. With a write error the first symbol modification step 32' can then be omitted. This reduces the number of adjacent values to be checked.

In another preferred embodiment, the selection of whether only to increase or decrease a symbol value level can be made in accordance with the output of an estimator that tells which variant of error-induced voltage level change is more likely. The variant being more likely can then be examined first or exclusively.

The number of levels in MLC-based flash memories may increase in future by virtue of technical advances. The proposed decoding method will be suitable favorably in such MLCs as the number of modified codewords to be tested decreases for the same amount of data with increasing number of levels. The decoding method can be used with RS, BCH or other codes. The number of correctable errors by the decoder can be reduced to increase robustness by decreasing the miscorrection probability. The decoding method can be used in conjunction with Gray mapping. All embodiments of the decoding method described herein can be combined in part or as a whole. The proposed decoding method is not limited to MLC flash memory, but is applicable to any memory device exposing similar prerequisites as MLC NAND flash memory.

Tests on SLC flash memories have also shown that the error rate of pages depends also on the location of the page in the block. For instance, lower-numbered pages have been observed to have a significantly higher error rate than higher-numbered ones. This observation is dependent on the actual flash memory chip technology being used and can vary from manufacturer to manufacturer. However, if such a difference between locations within a codeword can be observed when a chip is being analyzed and classified, the decoding method described herein can be preferably further improved by taking into account that instead of traversing symbols linearly starting at the first one to perform the symbol modification steps, one can start with those symbols having a higher error probability.

The decoding method may be implemented in part or as a whole in software or hardware or a combination thereof. The decoding method may, implemented in hardware, be performed by a decoder. The decoding method may, implemented in software, be performed by a computer program product. The computer program product may be provided on a computer readable medium embodying software instructions executable by a computer to perform the steps of the decoding method. The computer-readable medium may, for example, be a CD-ROM, a DVD, a flash memory card, a hard disk, or any other suitable computer-readable medium, e.g. a storage medium within a network.

The invention claimed is:

1. A method for decoding a codeword (W) received from a flash memory comprising multi-level flash memory cells, wherein each multi-level flash memory cell stores one symbol (Si) of said codeword (W), and wherein an ECC decoder is arranged for decoding said codeword (W) into a decoded codeword (D) and correcting a maximum number (t) of errors, the method comprising:
   determining the number (e) of errors in said codeword W;
   if said number (e) of errors is more than the maximum number (t) of errors that said ECC decoder can correct, performing at least one of:
      generating a first modified codeword (W') by increasing the value of a said symbol (Si) to the next higher value level; and
      generating a second modified codeword (W") by decreasing the value of a said symbol (Si) to the next lower value level;
   calculating a corrective effect of at least one of the first and second modified codewords; and
   determining at least one of the decoded codeword (D) based on said corrective effect and an erasure of the codeword (W),
   wherein determining at least one decoded codeword (D) further comprises:
      decoding the modified codewords (W', W") and for all decoded modified codewords (D', D"), counting the number (x(D)) of occurrences of the decoded modified codewords (D', D"); and
      determining if there is one decoded modified codeword (D', D") whose number (x(D)) of occurrences is equal to one more than the maximum number (t) of errors,
      wherein the decoded modified codewords (D', D") are converted into hash values which are entered into a candidate hash map (H), together with the number (x(D)) of occurrences of said decoded modified codewords (D', D"), wherein the entered hash values correspond only to candidate code words among the decoded modified codewords (D', D") that satisfy a criteria where a value difference between each symbol Si of the candidate codewords D', D" and the corresponding symbol Si of the received codeword W is not larger than 1.

2. The method according to claim 1, wherein the generation of the first modified codeword (W') is omitted if the value of said symbol (Si) is at the highest level that said multi-level flash memory cells can be programmed to.

3. The method according to claim 1, wherein the generation of the second modified codeword (W") is omitted if the value of said symbol (Si) is at the lowest level that said multi-level flash memory cells can be programmed to.

4. The method according to claim 1, wherein at least one of the first and second modified codewords (W', W") is generated with another said symbol (Si).

5. The method according to claim 4, wherein the corrective effect is calculated responsive to at least one of the first and second modified codewords (W', W") being generated.

6. The method according to claim 4, wherein at least one of the first and second modified codewords (W', W") is generated for other symbols in the codeword (W) until the corrective effect indicates that at least one of the modified codewords (W', W") is decodable into the decoded codeword (D).

7. The method according to claim 4, wherein the corrective effect is calculated responsive to at least one of the modified codewords (W', W") has been generated for all said symbols in the codeword (W).

8. The method according to claim 4, wherein the generation of at least one of the first and second modified codewords (W', W") is repeated, moving from one symbol (Si) to the next right symbol (Si+1) in the codeword (W).

9. The method according to claim 4, wherein the order of the symbols (Si) on which the first and second modified codewords (W', W") are generated is based on an estimation of the error probability of said symbols.

10. The method according to claim 1, further comprising determining a most likely error type for the multi-level flash memory cells selecting which of the modified codewords (W', W") to generate based on the most likely error type.

11. The method according to claim 1, further comprising:
calculating respective numbers (e', e") of errors in the modified codewords (W', W") and
determining whether said calculated numbers (e', e") of errors in said modified codewords (W', W") are lower than the number (e) of errors in said codeword (W).

12. The method according to claim 1, further comprising determining the correct decoded codeword (D) from the determined decoded modified codeword (D', D") wherein the number (x(D)) of occurrences is equal to one more than the maximum number (t) of errors.

13. The method according to claim 1, further comprising determining an erasure of the codeword (W) wherein the number (x(D)) of occurrences is not equal to one more than the maximum number (t) of error.

14. A decoding apparatus for decoding a codeword (W) received from a flash memory comprising multi-level flash memory cells, wherein each multi-level flash memory cell stores one symbol (Si) of said codeword (W), said decoding apparatus comprising:
an ECC decoder for decoding said codeword (W) into a decoded codeword (D), and correcting a maximum number (t) of errors,
an input port for receiving said codeword (W),
a calculator for:
determining a number (e) of errors in said codeword (W),
if said number (e) of errors is more than the maximum number (t) of errors said decoder can correct, performing at least one of: generating a first modified codeword (W') by increasing the value of a said symbol (Si) to the next higher value level, and generating a second modified codeword (W") by decreasing the value of a said symbol (Si) to the next lower value level;
calculating the corrective effect of the symbol modification steps (32', 32");
determining at least one of the decoded codeword (D) based on said corrective effect and an erasure of the codeword; and an output port for outputting said decoded codeword (D),
wherein determining at least one decoded codeword (D) further comprises:
decoding the modified codewords (W', W") and for all decoded modified codewords (D', D"), counting the number (x(D)) of occurrences of the decoded modified codewords (D', D"); and
determining if there is one decoded modified codeword (D', D") whose number (x(D)) of occurrences is equal to one more than the maximum number (t) of errors,
wherein the decoded modified codewords (D', D") are converted into hash values which are entered into a candidate hash map (H), together with the number (x(D)) of occurrences of said decoded modified codewords (D', D"), wherein the entered hash values correspond only to candidate code words among the decoded modified codewords (D', D") that satisfy a criteria where a value difference between each symbol Si of the candidate codewords D', D" and the corresponding symbol Si of the received codeword W is not larger than 1.

15. A computer program product for decoding a codeword (W) received from a flash memory comprising multi-level flash memory cells, wherein each multi-level flash memory cell stores one symbol (Si) of the codeword (W), the computer program product comprising a computer-readable medium embodying program instructions executable by a processor to:
determine a number (e) of errors in the codeword (W);
if the number (e) of errors is more than a maximum number (t) of errors that an ECC decoder can correct, perform at least one of: generating a first modified codeword (W') by increasing the value of said symbol (Si) to the next higher value level, and generating a second modified codeword (W") by decreasing the value of said symbol (Si) to the next lower value level:
calculate a corrective effect of at least one of the first and second modified codewords; and
determine at least one of the decoded codeword (D) based on the corrective effect and an erasure of the codeword (W),
wherein determining at least one decoded codeword (D) further comprises:
decoding the modified codewords (W', W") and for all decoded modified codewords (D', D"), counting the number (x(D)) of occurrences of the decoded modified codewords (D', D"); and determining if there is one decoded modified codeword (D', D") whose number (x(D)) of occurrences is equal to one more than the maximum number (t) of errors, wherein the decoded modified codewords (D', D") are converted into hash values which are entered into a candidate hash map (H), together with the number (x(D)) of occurrences of said decoded modified codewords (D', D"), wherein the entered hash values correspond only to candidate code words among the decoded modified codewords (D', D") that satisfy a criteria where a value difference between each symbol Si of the candidate codewords D', D" and the corresponding symbol Si of the received codeword W is not larger than 1.

16. The computer program product according to claim 15, wherein the generation of the first modified codeword (W) is omitted if the value of said symbol (Si) is at the highest level that said multi-level flash memory cells can be programmed to.

17. The computer program product according to claim 15, wherein at least one of the first and second modified codewords (W', W") is generated with another said symbol (Si).

18. The computer program product according to claim 15, wherein the generation of at least one of the first and second modified codewords (W', W") is repeated, moving from one symbol (Si) to the next right symbol (Si+1) in the codeword (W).

* * * * *